United States Patent
Reshefsky

(10) Patent No.: US 6,873,862 B2
(45) Date of Patent: Mar. 29, 2005

(54) WIRELESS HEADPHONES WITH SELECTIVE CONNECTION TO AUXILIARY AUDIO DEVICES AND A CELLULAR TELEPHONE

(76) Inventor: Marc Alan Reshefsky, 2238 Cathedral Ave. NW., Washington, DC (US) 20008

(*) Notice: Subject to any disclaimer, the term of this patent is extended or adjusted under 35 U.S.C. 154(b) by 601 days.

(21) Appl. No.: 09/910,933

(22) Filed: Jul. 24, 2001

(65) Prior Publication Data

US 2003/0022703 A1 Jan. 30, 2003

(51) Int. Cl.[7] .................................................. H04M 1/00
(52) U.S. Cl. .............................. 455/569.1; 455/575.1; 455/90.2; 579/430
(58) Field of Search .......................... 455/3.06, 550.1, 455/553.1, 556.1, 556.2, 557, 559, 563, 569.1, 575.1, 575.2, 575.6, 90.1, 90.2, 90.3, 353; 381/74, 384, 370, 371, 374, 375, 376; 379/428.02, 430

(56) References Cited

U.S. PATENT DOCUMENTS

| 4,499,593 | A | * | 2/1985 | Antle | 381/378 |
| 5,247,705 | A | * | 9/1993 | Attig et al. | 455/74 |
| 5,862,235 | A | * | 1/1999 | Kowalczyk | 381/79 |
| 5,978,689 | A | * | 11/1999 | Tuoriniemi et al. | 455/569.1 |
| 6,304,764 | B1 | * | 10/2001 | Pan | 455/569.2 |
| 6,606,506 | B1 | * | 8/2003 | Jones | 455/566 |
| 2002/0094845 | A1 | * | 7/2002 | Inasaka | 455/566 |

* cited by examiner

Primary Examiner—Nay Maung
Assistant Examiner—Shaima Q Aminzay
(74) Attorney, Agent, or Firm—John S. Hale; Gipple & Hale

(57) ABSTRACT

An apparatus comprising a pair of headphones which have selective port connections formed in their housings allowing connection with an auxiliary audio appliances such as an AM/FM radio, CD player, cassette players, MP3 player as well as a cellular telephone. The apparatus specifically has one port for connection to a cellular telephone which is connected to a switching circuit which when activated by the occurrence a telephonic connection interrupts the audio from the auxiliary audio appliance.

23 Claims, 1 Drawing Sheet

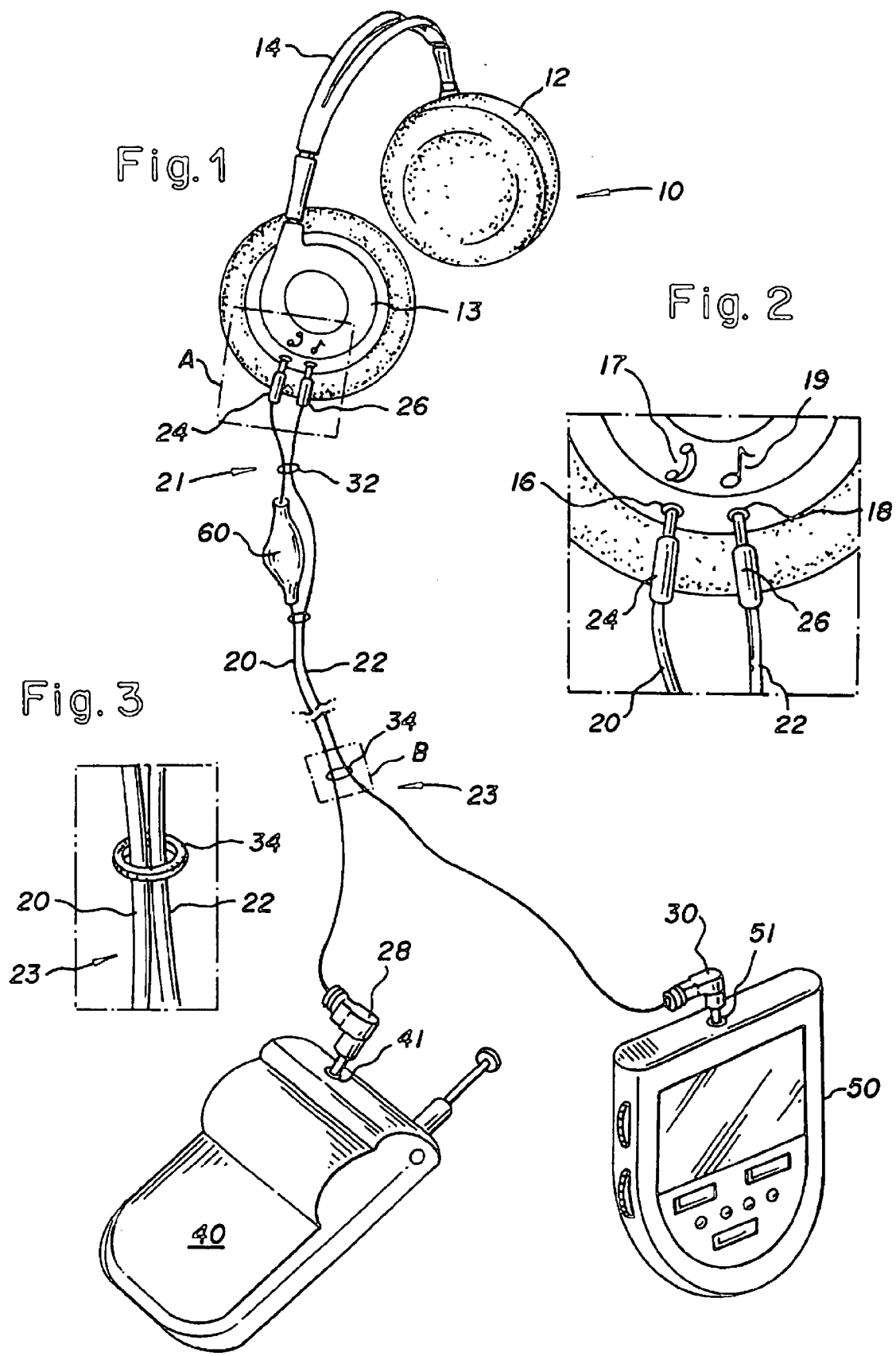

WIRELESS HEADPHONES WITH SELECTIVE CONNECTION TO AUXILIARY AUDIO DEVICES AND A CELLULAR TELEPHONE

FIELD OF THE INVENTION

The present invention relates generally to a pair of headphones, at least one of which has selective connection ports for cables interconnecting a cellular telephone and auxiliary appliances such as an AM/FM radio, CD player, cassette player or MP3 player. The connection port for the cellular phone is connected to circuit means which overrides the feed for the auxiliary audio appliance when a telephonic connection occurs. The cellular telephone cable has a microphone mounted thereon which allows the user to speak to the calling party without the requirement of removing the cellular phone from its carrying pocket and lifting the same to the call receivers mouth.

BACKGROUND OF THE INVENTION

A present benefit enjoyed by present day society is the ready availability of music and other audio programming. With devices such as radios, cassette tape players, compact disc players and MP3 players a person may listen to virtually any music or audio programming. When such devices are combined with the wide spread use of headphones either by building the same into the headsets or electronically connecting the same to the headsets, users have gained great flexibility in that the audio programming may be played and listened to in almost any location or setting. Furthermore a person may listen to virtually any music or other audio programming and the hands are left clear and physical activity can be incorporated with the ability for sound entertainment. Wireless headphones generally receive a radio frequency transmission form the selected audio programming of the user.

In the same manner cellular telephones have become widespread and are carried around the home, in an office, shopping, traveling or while conducting exercise or other activities. The user can easily move from one location to another during a phone call while receiving the phone information, perform a chore or continue the activity engaged in prior to the phone call. There are a number of problems encountered in prior art as cordless telephones commonly referred to as cell phones have become widespread in our society. Since cell phones are carried everywhere, they are often carried by individuals engaged in physical exercise such as walking, hiking, biking and running. Conversely when the phone rings, the individual must stop whatever he or she is currently doing to complete the call which also entails holding the same close to the face for reception and transmission while also requiring that the user keep his or her hand occupied holding the cellular phone. Obviously one cannot continue physical exercise as the phone would bang against the face resulting in possible injury or an interruption of the ongoing conversation. In addition keeping one's hand occupied in grasping or holding the cellular telephone for a long period of time is tiresome and precludes the use of the hand for other pursuits. Other devices which are also commonly used are portable radios, CD players and the like which provide the user with an availability of music and other audio programming.

The prior art discloses numerous examples of headphones with telephone and/or radio interconnection particularly where the same is built in the headset and has an external antenna. As an example, U.S. Pat. No. 6,006,115 discloses a pair of wireless headphones with a built in sound system to provide music and audio programming to a user. A telephone base unit also broadcasts notification of incoming phone calls to the wireless headphones in the form of an audio signal to notify the user of the incoming call. The headphones may also provide an audio signal over or instead of the audio programming to notify the user of the incoming call. The headphones may also incorporate a microphone so that he user can receive the phone call with the headphones.

U.S. Pat. No. 4,928,302 is directed in part toward a voice actuated dialing apparatus for registering a plurality of telephone numbers and automatically dialing a telephone number through the use of voice recognition software.

In U.S. Pat. No. 4,907,266 a headphone convertible telephone hand set is disclosed which can be converted into a headphone like telephone to produce double form or stereo like sound in its receiver permitting the same to be worn on a user's head freeing the user's hands and allowing other functions. When extended outward from the telephone hand set to form a headphone, the movable receiver remains electrically connected with the inner circuit of the telephone hand set using a first and second arc-shaped telescopic slide strips, each having a central longitudinal slide slot to produce a double form or stereo like sound together with the stationary receiver.

Other headsets are also known such as the headset with built in radio receiver and external antenna shown in U.S. Design Pat. No. 388,788; the headset with ear protectors with a built in radio and external antenna shown in U.S. Des. Pat. No. 411,200 and the cordless telephone headset with external antenna and external microphone shown in U.S. Des. Pat. No. 429,229.

The prior art does not solve the problem of dual use of a wireless headphone used with audio programming and also carrying a cell phone. If the phone rings while the user is listening to music or other audio programming with the headphones, the user may not be able to hear the phone and may miss the phone call or pick it up to late to connect with the caller. Accordingly there is a need for an apparatus for providing portable audio programming for the enjoyment of a user while preventing the user from missing the call or being forced to stop the particular activity which he or she is presently undertaking.

The present invention solves the above problems in a manner not disclosed in the known prior art.

SUMMARY OF THE INVENTION

The present invention is directed toward a apparatus which includes headphones with speakers electrically connected by an adjustable head piece which fits over the head of the user with one of the headphones being provided with a plurality of female ports which receive input cables from a cellular telephone and an auxiliary audio device such as a AM/FM radio, CD player, MP3 player, cassette player and the like. The apparatus also includes the direct transfer of sound via wireless transmitter or cable from any of the sound devices; cellular telephone, CD player, MP3 player to the headphones whether or not the transmitter and the receiver is contained within the source and the headphone. The apparatus is further provided with an internal switching circuit which receives a transmission from the cell phone and blocks or interrupts the audio system from the auxiliary audio device. A microphone is located external to the cellular telephone on the cable leading from the cellular telephone to the headphone allowing the user to answer and conduct a communication on the cell phone while continuing the activity which he or she was then engaged in.

It is an object of the invention to provide a headphone which allows the user to receive audio programming for the listening enjoyment of the user and to keep the user from missing telephone calls while listening to such audio programming.

It is another object of the present invention to provide a headset which can be used with any cellular telephone and any one or more of a number of commercially obtainable auxiliary audio devices.

It is yet another object of this invention to provide an apparatus that is highly compact and one that can be easily stored and transported and used with cellular telephones and audio devices obtained at another locality.

Yet another object of this invention is to provide a device that allows the user to engage in a telephone conversation with a caller without having to hold the cellular telephone in his or her hand and to move about carrying on the previously undertaken job or exercise while the telephone call is being undertaken.

Still another object of this invention is to provide a device having an attachable cable which allows a microphone to be externally carried away from the cellular telephone and the headset.

In the accompanying drawings, there is shown an illustrative embodiment of the invention from which these and other objectives, novel features and advantages will be readily apparent.

BRIEF DESCRIPTION OF THE DRAWINGS

FIG. 1 is a perspective view of the dual headset with accessories;

FIG. 2 is an enlarged view of the section of the headset shown in block A of FIG. 1; and FIG. 3 is an enlarged view of the cable tie shown in block B of FIG. 1

DETAILED DESCRIPTION OF THE PREFERRED EMBODIMENT

The best mode and the preferred embodiment of the novel dual headphone with attachment means for use with a cellular telephone and an auxiliary sound transmission device of the present invention is shown generally in FIGS. 1 through 3.

FIG. 1 illustrates the dual wireless headphones 10 with two independent speakers 12 connected together by a telescopic arc-shaped band 14 which is adjustable and is worn over the top of the user's head. This adjustable band is worn over the top of the user's head and positions the speakers 12 so that they are located and held over the ears. The independent speakers 12, one in each earphone allow audio programming to be provided in stereo. Either speaker housing 13 of the respective head phone 10 may be provided with a plurality of female ports which allow electrical interconnection with a respective speaker 12. One of female ports 16 allows connection to any cellular phone 40 having an ear headphone connectivity connection such as port 41 and another female port 18 allows for connection to an audio device 50 with an headphone ear connectivity connection such as port 51. The audio device 50 can be a radio, CD player, MP3 player or cassette player.

As best shown in FIG. 2 a telephone symbol 17 is molded into the plastic housing 13 of an earphone or is mounted to the earphone in direct proximity to the telephone female port 16 and a musical note 19 is molded into the plastic housing 13 of the earphone or applied to the housing in direct proximity to the auxiliary audio appliance female port 18.

Connector cables 20 and 22 with proximal respective male plug ends 24 and 26 fit into female port 16 and female port 18 providing for electrical connection to a respective cellular telephone 40 and portable radio 50 via distal male plug ends 28 and 30 of the cables. Each proximal end section 21 of cables 20 and 22 is held together in close proximity by a round rubber O shaped ring 32 and the distal end sections 23 of cables 20 and 24 are also held together in close proximity by a round rubber O shaped ring 34. These connector rings 32 and 34 keep the cables 20 and 22 from wildly swinging around when the user is moving around, walking or running or engaged in physical exercise.

When the user is walking, jogging or engaging in physical exercise and wearing headphones listening to music or audio of any form, the user's audio program will automatically be interrupted (overridden) by incoming phone call which can be accepted or rejected. This is accomplished by a simple switching circuit built into the housing of the headphone with the port connection which deactivates or prevents reception of the audio signal from the auxiliary audio device 50 when the cellular telephone 40 begins to ring, vibrate or emit any form of programed audio signal When the call is finished the same switching circuit activates the audio connection from the auxiliary audio device 50 and the audio program resumes. Such circuits for accomplishing such switching are known in the art and can take many forms as for example a wheat stone bridge. A microphone 60 is mounted on cable 20 which serves as a voice amplification for the cellular telephone so that the user can talk without stopping his or her activity. The microphone 60 is activated upon receipt of an incoming call and deactivates a period of time after a call terminates. If desired the microphone 60 can have voice activated software which transmits a signal to the cellular telephone 40 to call a preprogrammed number and to also stop the audio programmig or to simply turn the microphone off. Likewise the microphone 60 can be used to selectively change the sound volume on the cellular telephone or place the telephone on call waiting if another incoming call is received on the cellular telephone 40 or to selectively increase or decrease the volume of the auxiliary audio device 50. While the term auxiliary audio device has been used in describing the present invention as used in connection with the cellular telephone it is within the breath of the invention to substitute any one of number of auxiliary audio devices with the cellular telephone such as a AM/FM radio, CD player, cassette player, or MP3 player or the like.

It is envisioned that the cellular telephone and auxiliary audio device can be carried by the user in an optional belt, (not shown) or in a fanny pack or other carrying device. When used on a belt, carrying cases or platforms with velcro securing strips can be used to secure the cellular telephone and/or auxiliary audio device in a secure position on the belt to reduce movement of the telephone and audio device.

The present invention also includes another embodiment which eliminates the cable connection where the direct transfer of sound is from a wireless transmitter mounted or connected to any of the sources of the audio, namely the cellular telephone, CD player, MP3 player, radio to a receiver in the headphone whether or not the transmitter and the receiver is contained within the audio source and the headphone or are external to the same. In this embodiment an RF or Infrared transmitter with a male connector plug is mounted on the sound source and is connected to either analog or digital sound sources. The transmitter converts analog signal to digital using a high resolution delta-sigma 64× oversampling A/D converter. The digital integral receiver is fed CD quality digital data which is converted back to analog by an onboard Bitstream A/D converter. Frequency response is 10–22,000 Hz. The transmitter is plugged into the cellular telephone and auxiliary audio device and the RF waves or infrared signal are picked up by a receiver mounted in the headphones.

The prior description has been presented only to illustrate and describe the invention. It is not intended to be exhaustive or to limit the invention to any precise form. Modifications and variations are possible in light of the above teaching of the invention.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims:

What I claim is:

1. An apparatus for providing portable audio programming for a user while preventing the user from missing telephone calls comprising:
    a pair of headphones, each of which has a housing containing a speaker;
    a head band connecting each of said headphones adapted to be fitted over the head of a user so that the headphones fit over a user's ears, said head band also containing electrical transmission means electrically connecting the speakers in the headphones;
    at least one of said headphones being provided with at least a pair of female ports adapted to receive cable plugs which are formed on the end of cables leading to an external auxiliary audio device and an external cellular telephone separate from said auxiliary audio device and means in at least one headphone to terminate an audio signal emanating from said auxiliary audio device; and
    a microphone mounted on a cable leading to said cellular telephone with means for receiving and transmitting audible messages during a telephone conversation.

2. An apparatus as claimed in claim 1 wherein said microphone contains a switch for activating and deactivating said cellular phone.

3. An apparatus as claimed in claim 1 wherein said headphone housing contains a switching circuit which is activated by an incoming telephone call to switch off the audio signal from the auxiliary audio device.

4. An apparatus as claimed in claim 1 wherein at least one headphone housing is provided with marking indicia to indicate which female port is to be used with a cell phone and which female port is to be used with an auxiliary audio device.

5. An apparatus as claimed in claim 1 wherein said auxiliary sound device consists of a group selected from AM/FM radio, CD player, cassette players, MP3 player.

6. An apparatus as claimed in claim 1 wherein said microphone contains voice activated software which controls volume of the cellular telephone audio volume.

7. An apparatus as claimed in claim 1 wherein said microphone contains voice activated software for activating and deactivating said cellular telephone.

8. An apparatus for providing portable audio programming for a user while preventing the user from missing telephone calls comprising:
    a pair of headphones, each headphone being provided with a housing with a speaker mounted therein;
    a head band connecting said headphones adapted to be fitted over the head of a user, said head band also containing electrical transmission means connected to the speakers in the headphones;
    at least one of said headphones housings being provided with at least a pair of female ports adapted to receive cable plugs secured to the end of cables, said cables being constructed to engage an auxiliary audio device and a cellular telephone;
    switching circuit means located in said housing in connection with at least one of said female ports to interrupt audio signals transmitted from an auxiliary audio device when a cellular telephone is activated by an incoming call; and
    a microphone mounted on a cable leading from said housing to said cellular telephone for receiving and transmitting audible messages occurring during a telephone conversation.

9. An apparatus as claimed in claim 8 wherein said microphone contains voice activation software for calling a preprogrammed number on said cellular telephone.

10. An apparatus as claimed in claim 8 wherein said female ports are provided with marking indicia to indicate which female port is to be used with a cell phone and which female port is to be used with an auxiliary sound device.

11. An apparatus as claimed in claim 8 wherein said auxiliary audio device consists of a group selected from AM/FM radio, CD player, cassette players, MP3 player.

12. An apparatus as claimed in claim 8 wherein said microphone contains voice activation software for changing the volume on calls received on said cellular telephone.

13. An apparatus as claimed in claim 8 wherein said microphone contains voice activation software for activating said switching circuit to allow transmission of audio signals from said auxiliary audio device.

14. An apparatus as claimed in claim 8 wherein said switching circuit causes said microphone containing a voice activation software to announce another caller during a pending telephone conversation.

15. An apparatus for providing portable audio programming for a user while preventing the user from missing telephone calls comprising:
    a pair of headphones having a housing with speaker means mounted therein;
    a head band connecting said headphone adapted to be fitted over the head of a user, said head band also containing electrical means electrically connected to the speakers in the headphones;
    at least one of said headphones being provided with at least a pair of female ports, receiver means mounted to said female ports, said receiver means being constructed to receive signals emanating from an auxiliary audio device and a cellular telephone;
    switching circuit means located in said housing with said female ports to interrupt audio signals received by said receiver means from an auxiliary audio device before such signals are transmitted to a speaker when said cellular telephone is activated by an incoming call and emits a signal; and
    a microphone connected to said housing for receiving audible messages from said user to a caller.

16. An apparatus as claimed in claim 15 wherein said microphone contains a switch for activating and deactivating said cellular telephone.

17. An apparatus as claimed in claim 15 wherein said female ports are provided with marking indicia to indicate which female port is to be used with a cell phone and which female port is to be used with an auxiliary audio device.

18. An apparatus as claimed in claim 15 wherein said auxiliary audio device consists of a group selected from AM/FM radio, CD player, cassette players, MP3 player.

19. An apparatus as claimed in claim 15 wherein said receiver means is a infrared receiver.

20. An apparatus as claimed in claim 15 wherein said receiver means is a RF receiver.

21. An apparatus for providing portable audio programming for a user while preventing the user from missing telephone calls comprising:

a pair of headphones each of which has a housing containing a speaker;

at least one housing containing a switching circuit which is activated by an incoming telephone call to switch off the audio signal from an auxiliary audio device;

a head band connecting each of said headphones adapted to be fitted over the head of a user so that the headphones fits over a user's ears, said head band also containing electrical transmission means electrically connecting the speakers in the headphones;

at least one of said headphones being provided with at least a pair of female ports adapted to receive cable plugs which are formed on the end of cables leading to an auxiliary audio device and a cellular telephone; and a microphone mounted on a cable leading to said cellular telephone for receiving and transmitting audible messages during a telephone conversation, said microphone containing a switch for activating and deactivating said cell phone.

22. An apparatus as claimed in claim 1 wherein said microphone contains voice activated software which controls volume of the cellular telephone audio volume.

23. An apparatus as claimed in claim 1 wherein said microphone contains voice activated software for activating and deactivating said cellular telephone.

* * * * *